United States Patent
Ho

(10) Patent No.: US 6,459,379 B1
(45) Date of Patent: Oct. 1, 2002

(54) EARTHQUAKE-ALARM DEVICE

(76) Inventor: Rung-Sheng Ho, No. 55, Lane 22, Sec. 3, Hsin-Yi Rd., Chieh-Ting Hsiang, Kaohsiung Hsien (TW)

(*) Notice: Subject to any disclaimer, the term of this patent is extended or adjusted under 35 U.S.C. 154(b) by 0 days.

(21) Appl. No.: 09/993,444

(22) Filed: Nov. 19, 2001

(51) Int. Cl.[7] ............................................. G01W 1/00
(52) U.S. Cl. ...................... 340/601; 340/689; 340/690; 340/691.1; 340/693.5; 73/649; 200/61.52; 200/DIG. 20; 702/15
(58) Field of Search .................. 340/600, 601, 340/686.1, 691.1, 693.5, 689, 690; 73/654, 649; 702/15; 200/61.45 R, 61.52, DIG. 20

(56) References Cited

U.S. PATENT DOCUMENTS

| | | | | |
|---|---|---|---|---|
| 5,475,372 A | * | 12/1995 | Burke | 340/690 |
| 5,539,387 A | * | 7/1996 | Gitlis et al. | 340/690 |
| 5,596,183 A | * | 1/1997 | Haley | 340/690 |
| 5,633,463 A | * | 5/1997 | Szasz | 340/690 |
| 6,034,614 A | * | 3/2000 | Haley | 340/690 |
| 6,121,888 A | * | 9/2000 | Bognar | 340/690 |

\* cited by examiner

*Primary Examiner*—Daniel J. Wu
(74) *Attorney, Agent, or Firm*—Pearne & Gordon LLP

(57) ABSTRACT

An earthquake-alarm device has a housing, an upper metal plate, a lower metal plate, a contacting device, an alarm and a power supply. The lower metal plate is attached to the housing below the upper metal plate. The contacting device is arranged between the upper metal plate and the lower metal plate to electrically communicate the upper metal plate and the lower metal plate when an earthquake occurs. The contacting device has a metal rod pivotally attached to the upper metal plate and a conic weight screwed with the metal rod. The alarm is electrically connected to the upper metal plate and the lower metal plate. The power supply is electrically connected to the alarm to provide an electric power to the alarm. Accordingly, the alarm will sound as earthquake occurs. In addition, the alarming device is adjustable to adapt for different magnitudes of earthquake.

7 Claims, 3 Drawing Sheets

EARTHQUAKE-ALARM DEVICE

BACKGROUND OF THE INVENTION

1. Field of the Invention

The present invention relates to an alarm device, and more particularly to an earthquake-alarm device that can be adjusted to adapt for different magnitudes of earthquake.

2. Description of Related Art

Earthquakes have devastated many civilizations for thousands of years, whereby catastrophic deaths and even collapses of those civilizations have occurred. One reason for such heavy loss of life is that, despite many attempts, no-one has found an accurate method or device for warning people of the magnitude of the earthquakes. Some attempts have been made to alarm people about earthquakes but they have the drawback of not being able to indicate the magnitude of that particular quake. A particular problem is that earthquakes often occur at night whereby the disaster is aggravated due to sleepers failing to appreciate the impending danger and become trapped. Thus, there is a long and unfulfilled need for an earthquake alarm device responsive to differing magnitudes of the earthquake to avert cataclysmic disaster.

To overcome the shortcomings, the present invention tends to provide an earthquake-alarm device to obviate the aforementioned problems.

SUMMARY OF THE INVENTION

The main objective of the invention is to provide an earthquake-alarm device that is adjustable to warn of different magnitudes of earthquake. The earthquake-alarm device has a housing, an upper metal plate, a lower metal plate, a contacting device, an alarm and a power supply. The upper metal plate is attached to the housing. The lower metal plate is attached to the housing below the upper metal plate and aligns with the upper metal plate. A through hole is defined through the lower metal plate. The contacting device is arranged between the upper metal plate and the lower metal plate to electrically communicate the upper metal plate and the lower metal plate when an earthquake occurs. The contacting device has a metal rod pivotally attached to the upper metal plate and a conic weight screwed with the metal rod. The alarm is electrically connected to the upper metal plate and the lower metal plate. The power supply is electrically connected to the alarm to provide an electric power to the alarm. In such an arrangement, the upper metal plate will electrically communicate with the lower metal plate through the contacting device and the alarm will sound as earthquake occurs. In addition, because the conic weight is adjustable relative to the metal rod, the alarming device is also adjustable to adapt for different magnitudes of earthquake. The use of the alarm device is versatile.

Other objects, advantages and novel features of the invention will become more apparent from the following detailed description when taken in conjunction with the accompanying drawings.

DETAILED DESCRIPTION OF PREFERRED EMBODIMENT

Figure 1:
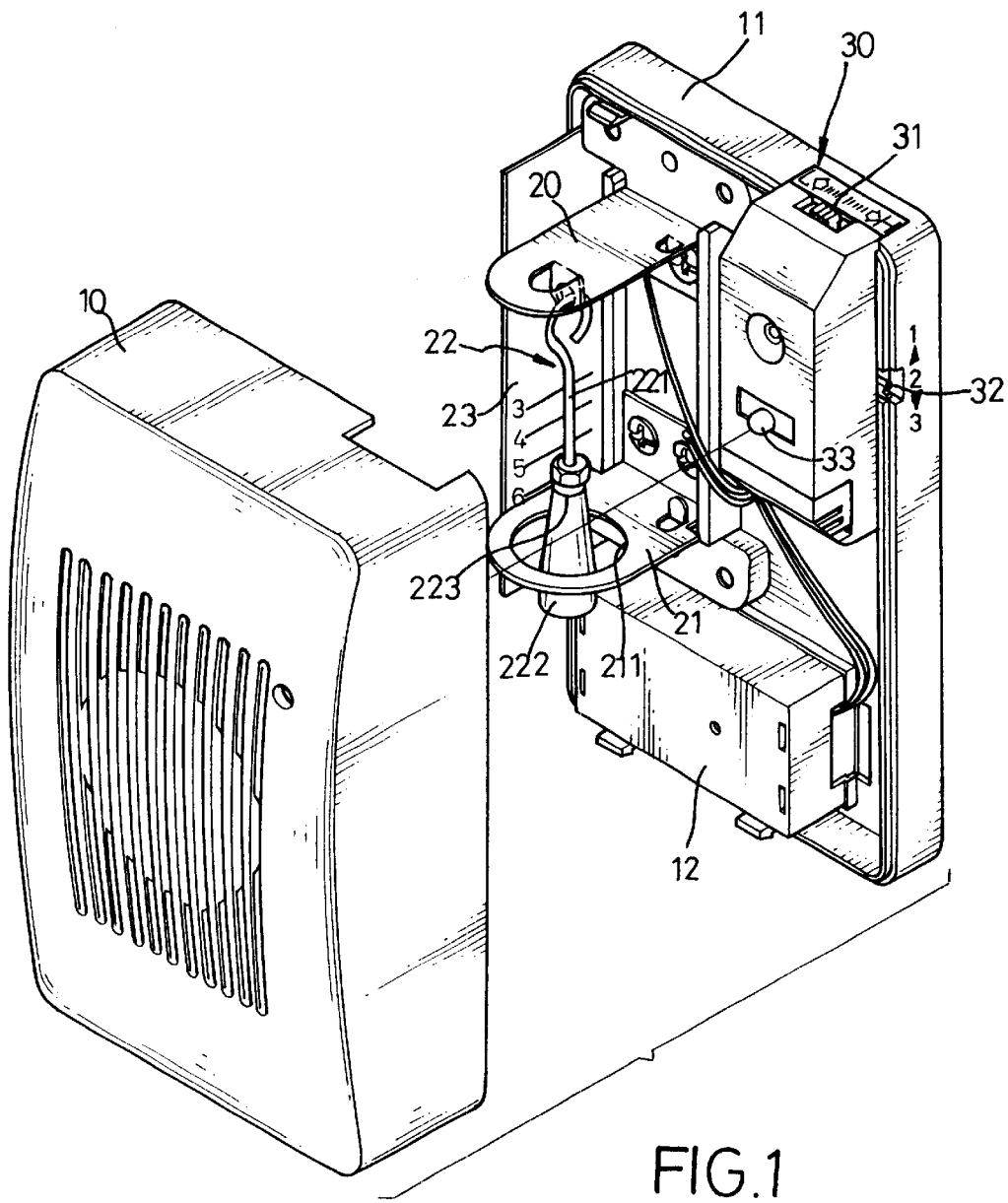
FIG. 1 is an exploded perspective view of an earthquake-alarm device in accordance with the present invention.

With reference to FIG. 1, an earthquake-alarm device in accordance with the present invention comprises a housing, an upper metal plate (20), a lower metal plate (21), a contacting device (22), an alarm (30) and a power supply (12). The housing is composed of a base (11) and a cover (10) attached to the base (11) to cover the other elements of the alarm device.

The upper metal plate (20) is laterally attached to the housing. The lower metal plate (21) is attached to the housing and below the upper metal plate (20) and aligns with the upper metal plate (20). A through hole (211) is defined through the lower metal plate (21).

The contacting device (22) is attached to the upper metal plate (20) and extends through the through hole (211) in the lower metal plate (21). The contacting device (22) comprises a metal rod (221) and a metal weight (222). A top end of the metal rod (221) is pivotally attached to the upper metal plate (20), and a bottom end of the metal rod (221) is threaded. The weight (222) has a conic shape and moveably extends through the through hole (211) in the lower metal plate (21). An inner thread is defined in the top of the weight (222) to screw with the thread on the metal rod (221), such that the weight (222) is adjustably attached to the bottom of the metal rod (221). The inner diameter of the through hole (211) is much larger than the largest outer diameter of the conic weight (222). Consequently, the weight (222) will not contact the lower metal plate (21) until a shock occurs.

In addition, an indication (23) is mounted on the housing. An indicating line (223) is mounted on the weight (222) and corresponds to the indication (23). Consequently, the height of the weight (222) can be adjusted relative to the metal rod (221) according to the indication (23) on the housing.

The alarm (30) is electrically connected to the upper metal plate (20) and the lower metal plate (21). The alarm (30) will sound as the upper metal plate (20) electrically communicates with the lower metal plate (21) through the contacting device (22). A loudness-controlling knob (31) is mounted on the alarm (30) and exposed from the housing to allow the user to control the loudness of the alarm (30). An alarm-selecting knob (32) is mounted on the alarm (30) and exposed from the housing to allow the user to select different sounds available from the alarm (30).

The power supply (12) is electrically connected to the alarm (30) to provide an electric power to the alarm (30). In practice, the power supply (12) is at least one dry cell or a storage battery. A light (33) is electrically connected to the power supply (12) and exposed from the housing. The light (33) will illuminate when the power supply (12) is in a low power condition. This can inform the user to check or to change the power supply (12).

Figure 2:
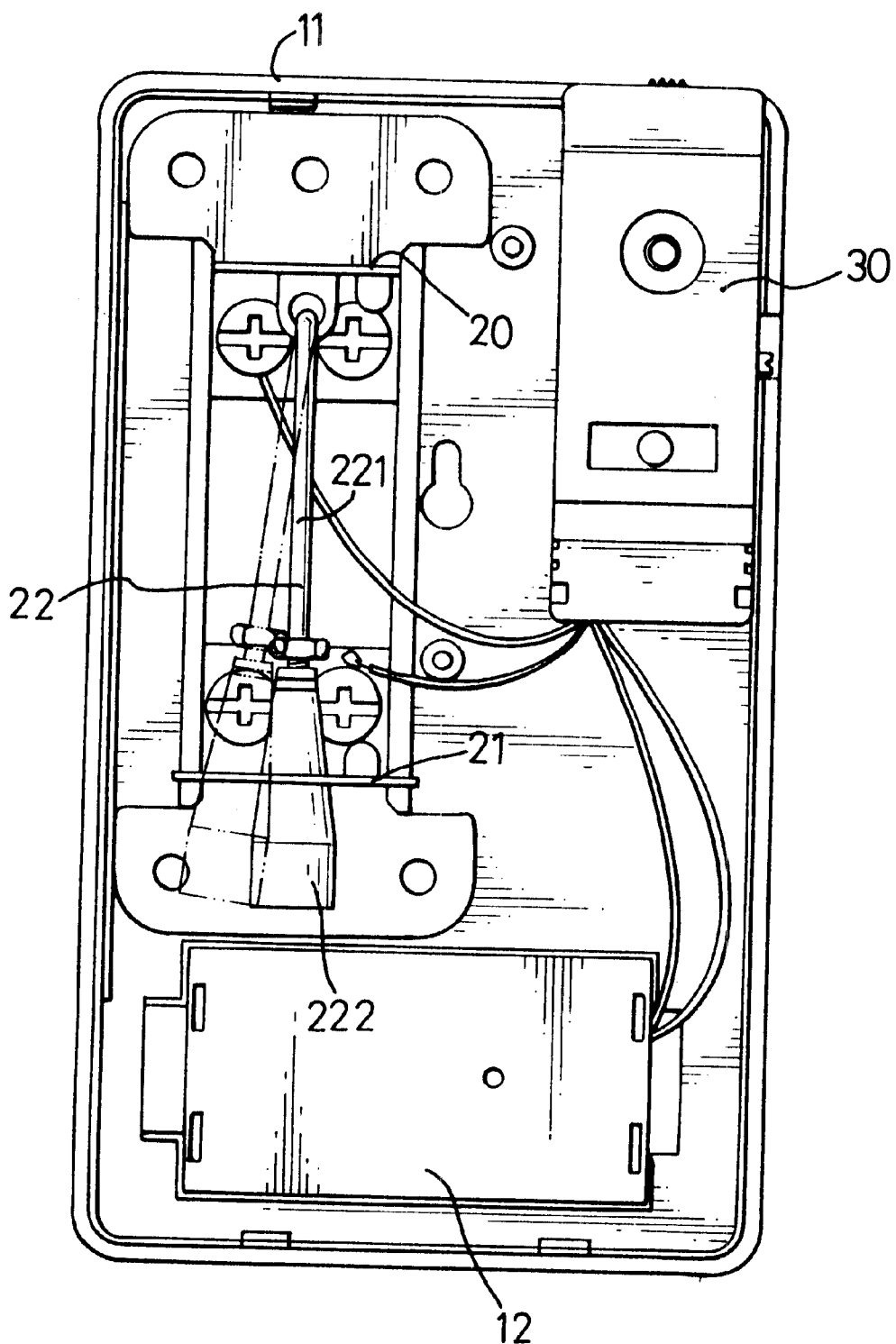
FIG. 2 is an operational plan view of the earthquake-alarm device in FIG. 1.

With reference to FIG. 2, when an earthquake occurs, the rod (221) with the weight (222) will swing relative to the upper metal plate (20) due to the shock generated by the earthquake. The weight (222) will contact the inner surface defining the through hole (211) in the lower metal plate (21) while the swing of the rod (221) with the weight (222) is large enough. The upper metal plate (20) and the lower metal plate (21) will be electrically communicated with the contacting device (22), and the alarm (30) will sound to alarm the user.

Figure 3:
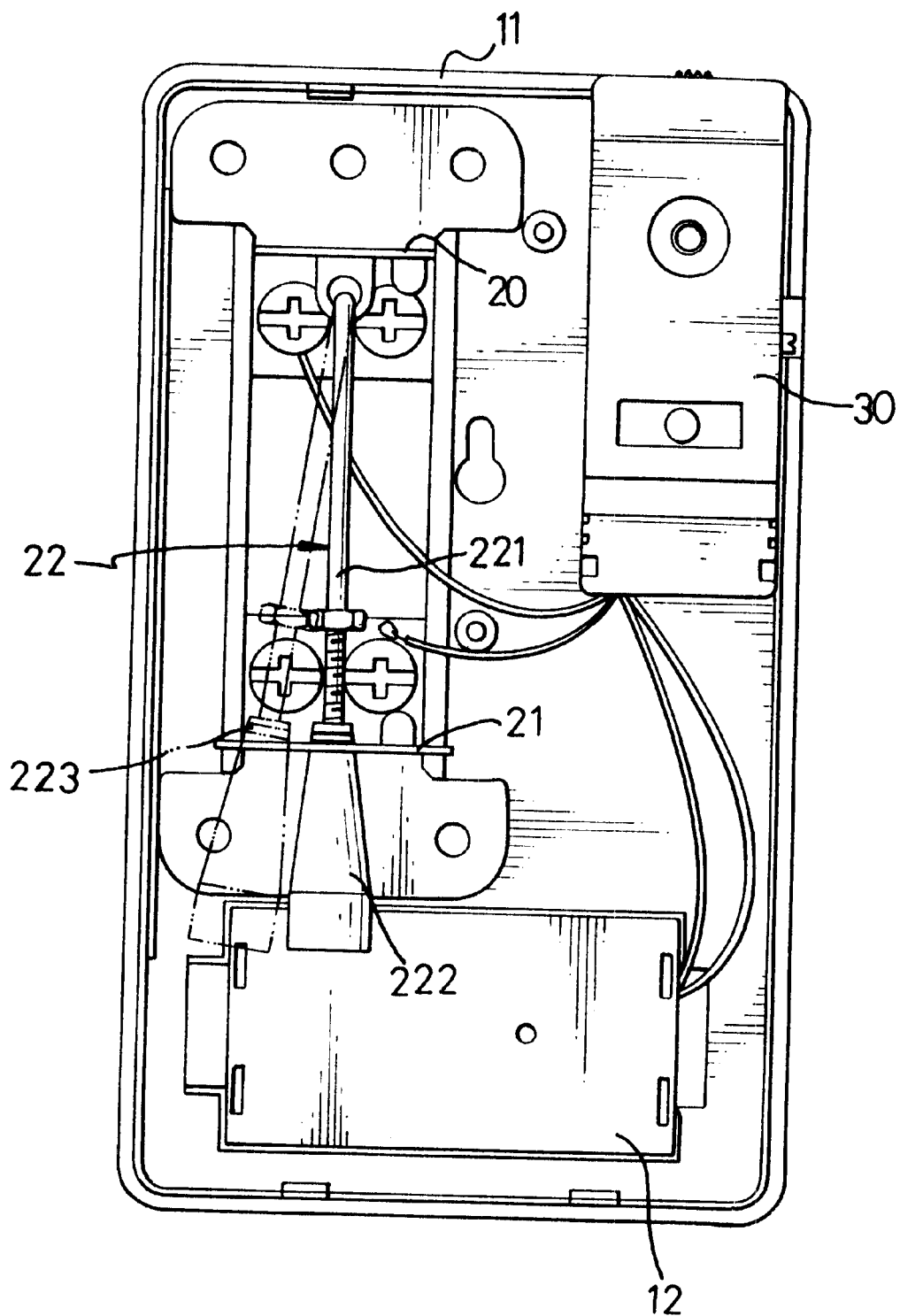
FIG. 3 is an operational plan view of the earthquake-alarm device in FIG. 1 showing that the weight is adjusted relative to the rod to different magnitudes of earthquake.

With reference to FIG. 3, because the weight (222) is adjusted relative to the rod (221) and the shape of the weight (222) is conic, the distance between the outer surface of the weight (222) and the inner surface of the through hole (211) will be changed as the weight (222) is located at different heights. The swing of the rod (221) with the weight (222) needed for contacting the lower metal plate (21) is also changed. Consequently, the alarm (30) will sound when different magnitudes of earthquake occur. Therefore, the alarm device is adjustable in accordance with the need of the user or the structural strength of the building. The use of the earthquake-alarm device is versatile.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An earthquake-alarm device comprising:

a housing;

an upper metal plate attached to the housing;

a lower metal plate attached to the housing below the upper metal plate and aligning with the upper metal plate, the lower metal plate having a through hole defined through the lower metal plate;

a contacting device arranged between the upper metal plate and the lower metal plate to electrically communicate the upper metal plate and the lower metal plate when an earthquake occurs, and the contacting device comprising:

a metal rod pivotally attached to the upper metal plate with a first end and having a thread formed on a second end; and a weight with a conic shape screwed with the thread on the second end of the metal rod and moveably extending through the hole in the lower metal plate;

an alarm electrically connected to the upper metal plate and the lower metal plate to alarm as the upper metal plate electrically communicates with the lower metal plate through the contacting device;

a power supply electrically connected to the alarm to provide an electric power to the alarm;

an indication mounted on the housing; and an indicating line mounted on the weight of the contacting device and corresponding to the indication on the housing so that the height of the weight can be adjusted relative to the metal rod according to the indication on the housing.

2. The earthquake-alarm device as claimed in claim 1, wherein the housing is composed of a base to which the upper metal plate, lower metal plate, the alarm and the power supply are attached and a cover attached to the base to cover the upper metal plate, lower metal plate, the alarm and the power supply.

3. The earthquake-alarm device as claimed in claim 1 further comprising a loudness-controlling knob mounted on the alarm and exposed from the housing to allow a user to control loudness of the alarm.

4. The earthquake-alarm device as claimed in claim 1 further comprising an alarm-selecting knob mounted on the alarm and exposed from the housing to allow a user to select different sounds available from the alarm.

5. The earthquake-alarm device as claimed in claim 1 further comprising a light electrically connected to the power supply and exposed from the housing to show a low power condition of the power supply.

6. The earthquake-alarm device as claimed in claim 1, wherein the power supply is at least one dry cell.

7. The earthquake-alarm device as claimed in claim 1, wherein the power supply is a storage battery.

* * * * *